(12) United States Patent
Hirano

(10) Patent No.: US 8,314,957 B2
(45) Date of Patent: Nov. 20, 2012

(54) PROCESSING APPARATUS, METHOD OF CONTROLLING THE SAME, AND STORAGE MEDIUM

(75) Inventor: Yasuhiko Hirano, Yokohama (JP)

(73) Assignee: Canon Kabushiki Kaisha (JP)

( * ) Notice: Subject to any disclaimer, the term of this patent is extended or adjusted under 35 U.S.C. 154(b) by 661 days.

(21) Appl. No.: 12/466,937

(22) Filed: May 15, 2009

(65) Prior Publication Data

US 2009/0284792 A1    Nov. 19, 2009

(30) Foreign Application Priority Data

May 16, 2008  (JP) ................................. 2008-129493

(51) Int. Cl.
*G06F 15/00* (2006.01)
*G06F 15/16* (2006.01)
(52) U.S. Cl. ........................................ 358/1.14; 709/237
(58) Field of Classification Search ................. 358/1.14, 358/1.15

See application file for complete search history.

(56) References Cited

U.S. PATENT DOCUMENTS

2005/0280511 A1\* 12/2005 Yokoyama et al. .......... 340/10.5

FOREIGN PATENT DOCUMENTS

JP       2007-152711 A    6/2007

\* cited by examiner

*Primary Examiner* — Saeid Ebrahimi Dehkordy
(74) *Attorney, Agent, or Firm* — Rossi, Kimms & McDowell LLP

(57) ABSTRACT

A processing apparatus enabling initial settings to be easily configured as a user desires e.g. upon purchase of the apparatus without unpacking the apparatus from a shipping carton. The processing apparatus comprises a wireless communication unit operable by an AC power supply or a battery, and an EEPROM operable by the AC power supply or the battery and stores initial settings information for the apparatus. An MCU of the processing apparatus determines whether electric power is currently supplied from the AC power supply or from the battery. Further, the MCU determines whether or not power-on history information on the AC power supply has been stored. When the battery is used and no power-on history information has been stored, the MCU rewrites the initial settings information stored in the EEPROM, based on initial settings information received from a dealer's PC by wireless communication.

9 Claims, 6 Drawing Sheets

PROCESSING APPARATUS, METHOD OF CONTROLLING THE SAME, AND STORAGE MEDIUM

BACKGROUND OF THE INVENTION

1. Field of the Invention

The present invention relates to a processing apparatus, such as a multifunction peripheral, a method of controlling the processing apparatus, and a storage medium storing a program for implementing the method.

2. Description of the Related Art

In a conventional image forming apparatus, such as a multifunction peripheral, the initial values of initial settings information, including a language setting, a sheet setting, and a prioritized operation mode setting, are set in advance. In general, when a user desires to change the initial settings after purchasing the apparatus, the user operates a user interface (UI) screen displayed e.g. on a display panel of the image forming apparatus, to thereby change the initial settings.

However, in order to change the initial settings, it is required to follow a menu hierarchy via the UI screen, and hence the user cannot dispense with troublesome operations. Further, in order for a retailer or the like person to change the initial settings as a user desires upon purchase of the image forming apparatus, it is required to unpack the apparatus from a shipping carton and turns on the power of the apparatus.

To eliminate this inconvenience, Japanese Patent Publication No. 2007-152711, for example, proposes a technique in which information is supplied to an apparatus packaged in a shipping carton, without unpacking the same, and the information is notified to a user when the power of the apparatus is turned on after unpacking of the apparatus.

However, in the technique disclosed in Japanese Patent Publication No. 2007-152711, since the information is notified to the user after the apparatus is unpacked and has its power turned on, the user has to carry out a configuration operation based on the notified information, and therefore the user still cannot dispense with troublesome operations.

SUMMARY OF THE INVENTION

The present invention provides a processing apparatus which enables initial settings to be configured as a user desires e.g. upon purchase of the apparatus without unpacking the apparatus from a shipping carton, a method of controlling the processing apparatus, and a storage medium storing a program for implementing the method.

In a first aspect of the present invention, there is provided a processing apparatus comprising a wireless communication unit configured to be operable by a main power supply or a sub power supply, a first storage unit configured to be operable by the main power supply or the sub power supply and store information on settings for operation of the apparatus, a first determination unit configured to be operable by the main power supply or the sub power supply and determine whether electric power is currently supplied from the main power supply or from the sub power supply, a second determination unit configured to be operable by the main power supply or the sub power supply and determine whether or not power-on history information on the main power supply has been stored, and a rewriting unit configured to be operable when the first determination unit determines that electric power is currently supplied from the sub power supply and when the second determination unit determines that no power-on history information on the main power supply has been stored, to rewrite the information on the settings stored in the first storage unit, based on information on settings received from an external apparatus by the wireless communication unit.

In a second aspect of the present invention, there is provided a method of controlling a processing apparatus including a wireless communication unit operable by a main power supply or a sub power supply, and a storage unit configured to be operable by the main power supply or the sub power supply and store information on settings for operation of the apparatus, comprising, determining whether electric power is currently supplied from the main power supply or from the sub power supply, determining whether or not power-on history information on the main power supply has been stored, and rewriting the information on the settings stored in the storage unit, based on information on settings received from an external apparatus by the wireless communication unit, when it is determined that electric power is currently supplied from the sub power supply and when it is determined that power-on history information on the main power supply has not been stored.

In a third aspect of the present invention, there is provided a computer-readable storage medium storing a program for causing a computer to execute a method of controlling a processing apparatus including a wireless communication unit operable by a main power supply or a sub power supply, and a storage unit configured to be operable by the main power supply or the sub power supply and store information on settings for operation of the apparatus, wherein the method comprises determining whether electric power is currently supplied from the main power supply or from the sub power supply, determining whether or not power-on history information on the main power supply has been stored, and rewriting the information on the settings stored in the storage unit, based on information on settings received from an external apparatus by the wireless communication unit, when it is determined that electric power is currently supplied from the sub power supply and when it is determined that power-on history information on the main power supply has not been stored.

According to the present invention, it is possible to simply configure initial settings as a user desires e.g. upon purchase of the apparatus without unpacking the apparatus from a shipping carton.

The features and advantages of the invention will become more apparent from the following detailed description taken in conjunction with the accompanying drawings.

DETAILED DESCRIPTION OF THE EMBODIMENTS

The present invention will now be described in detail below with reference to the accompanying drawings showing embodiments thereof.

Figure 1:
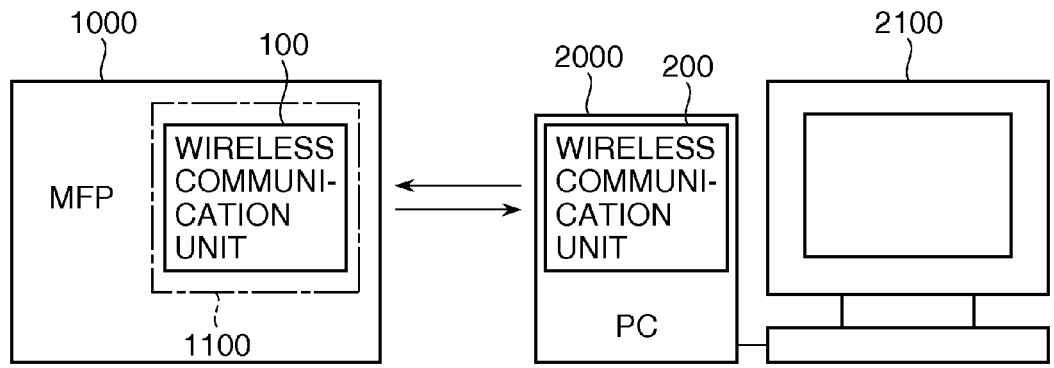
FIG. 1 is a schematic diagram of a processing system including a multifunction peripheral implementing a processing apparatus according to a first embodiment of the present invention.
Figure 2:
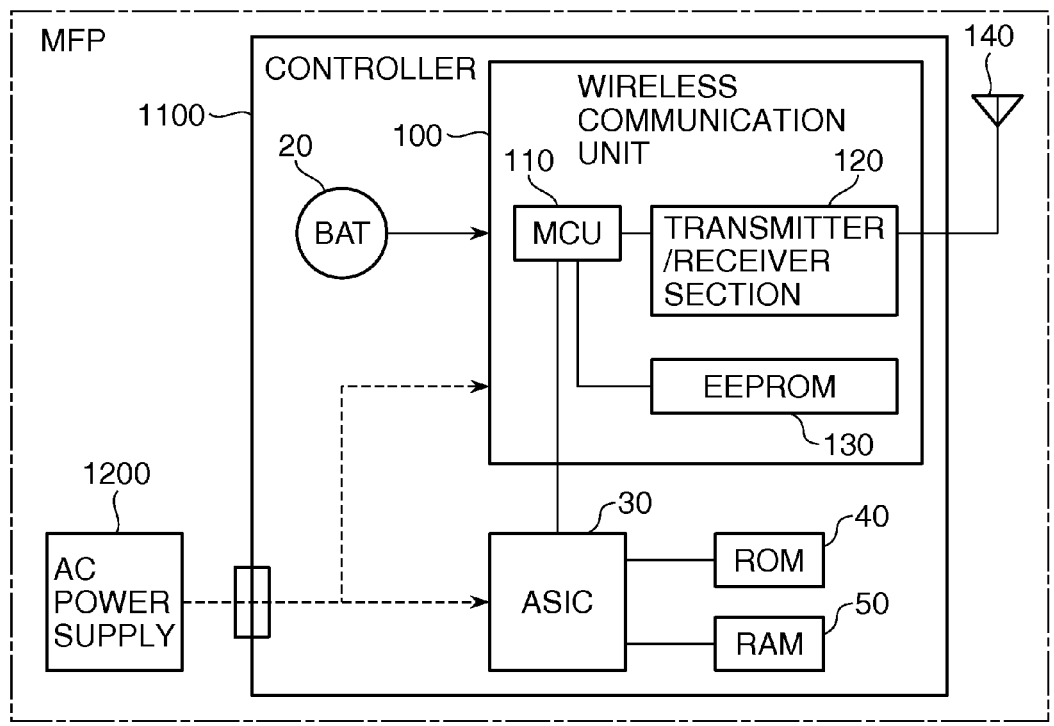
FIG. 2 is a block diagram of a controller of the multifunction peripheral appearing in FIG. 1.

FIG. 1 is a schematic diagram of a processing system including a multifunction peripheral implementing a processing apparatus according to a first embodiment of the present invention. FIG. 2 is a block diagram of a controller of the multifunction peripheral appearing in FIG. 1.

This processing system is comprised of an MFP 1000 as a multifunction peripheral (image forming apparatus) having a wireless communication unit 100 provided in a controller 1100, and a personal computer (PC) 2000 provided with a wireless communication unit 200. A display 2100 is connected to the PC 2000.

As shown in FIG. 2, the controller 1100 of the MFP 1000 is comprised of the wireless communication unit 100 supplied with electric power from a battery 20 implemented e.g. by a dry cell or from an AC power supply 1200, and an ASIC (Application Specific Integrated Circuit) 30 connected to a ROM (Read Only Memory) 40 and a RAM (Random Access Memory) 50. The ROM 40 stores programs and initial settings, and the RAM 50 is a readable/writable memory that functions as a work area for the ASIC 30. The ASIC 30 executes programs stored in the ROM 40 to control the overall operation of the controller 1100.

The wireless communication unit 100 is comprised of an MCU (Memory Control Unit) 110 for controlling the operation of the wireless communication unit 100, a transmitter/receiver section 120 for transmitting and receiving wireless communication data, and a nonvolatile memory (EEPROM) 130. The EEPROM 130 stores initial settings information for image forming operation, identification information (ID) assigned to the MFP 1000 (processing apparatus), information concerning specifications of the MFP 1000, and so forth. The EEPROM 130 corresponds to a first storage unit of the processing apparatus according to the present invention, and the ROM 40 corresponds to a second storage unit of the same.

Figure 3:
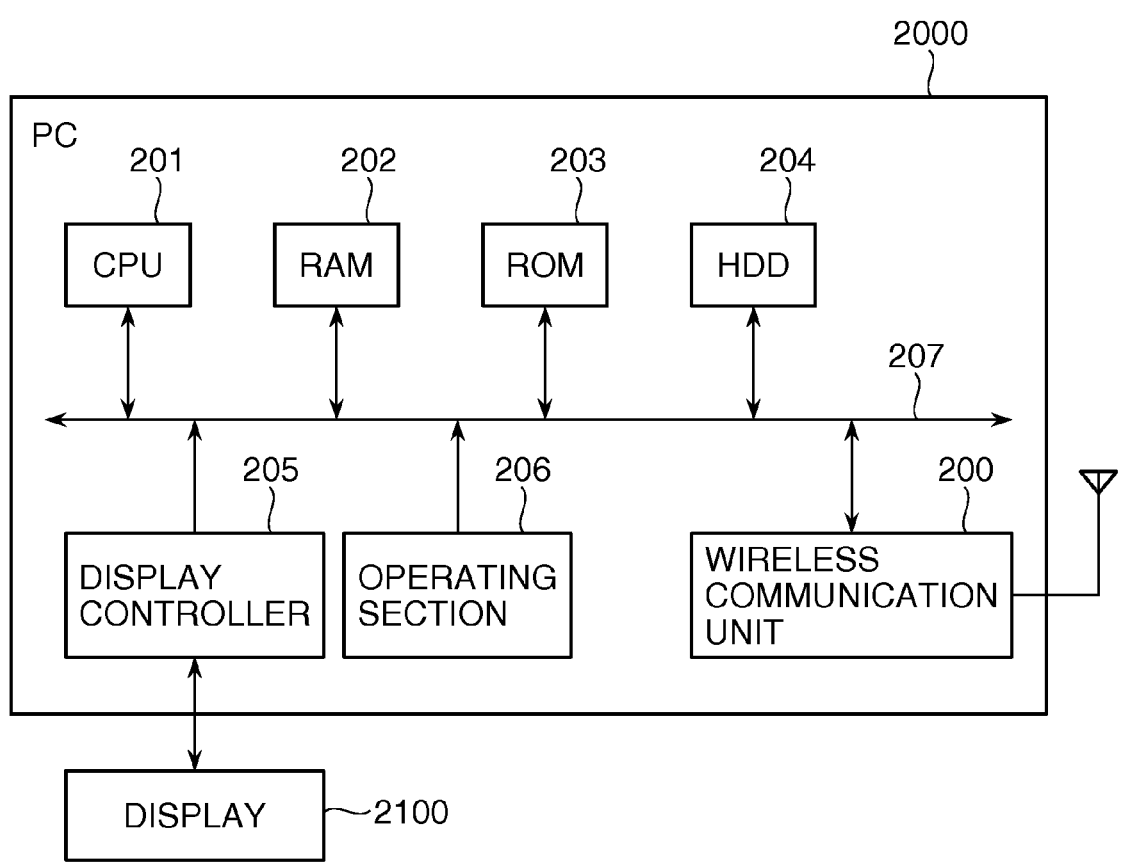
FIG. 3 is a block diagram of a dealer's PC.

FIG. 3 is a block diagram of the PC 2000.

The PC 2000 is comprised of a CPU 201, a RAM 202, a ROM 203, an HDD 204, a display controller 205, an operating section 206, and a wireless communication unit 200.

The CPU 201 performs various kinds of computations and control of the devices constituting the PC 2000, according to input signals and programs. The RAM 202 temporarily stores data, and is used as a work area for the CPU 201. The ROM 203 stores programs for controlling the PC 2000.

The HDD (Hard Disk Drive) 204 stores an application program for changing initial settings, registered information including identification information for identifying each of MFPs, and so forth. The display controller 205 controls display on the display 2100 implemented e.g. by an LCD. The operating section 206 is a device for accepting user operations. For example, the operating section 206 can be implemented by a keyboard provided with various keys for entering characters and so forth, or a pointing device, such as a mouse. The pointing device is used to control a mouse pointer displayed on a display screen of the display 2100 and operate program menus and other objects.

The wireless communication unit 200 is wirelessly connected to an external apparatus, such as the MFP 1000, to exchange control commands and data with the external apparatus. The PTP (Picture Transfer Protocol) is used as a protocol for data communication, for example.

Next, an initial settings-changing process executed by the MFP 1000 configured as described above, which implements the processing apparatus according to the first embodiment, will be described with reference to FIGS. 4, 5, and 6.

In the present embodiment, it is assumed that in a case where a user purchases the MFP 1000 e.g. in a dealer's shop, a dealer wirelessly customizes initial settings using the dealer's PC 2000 without unpacking the MFP 1000 from a shipping carton.

Figure 4:
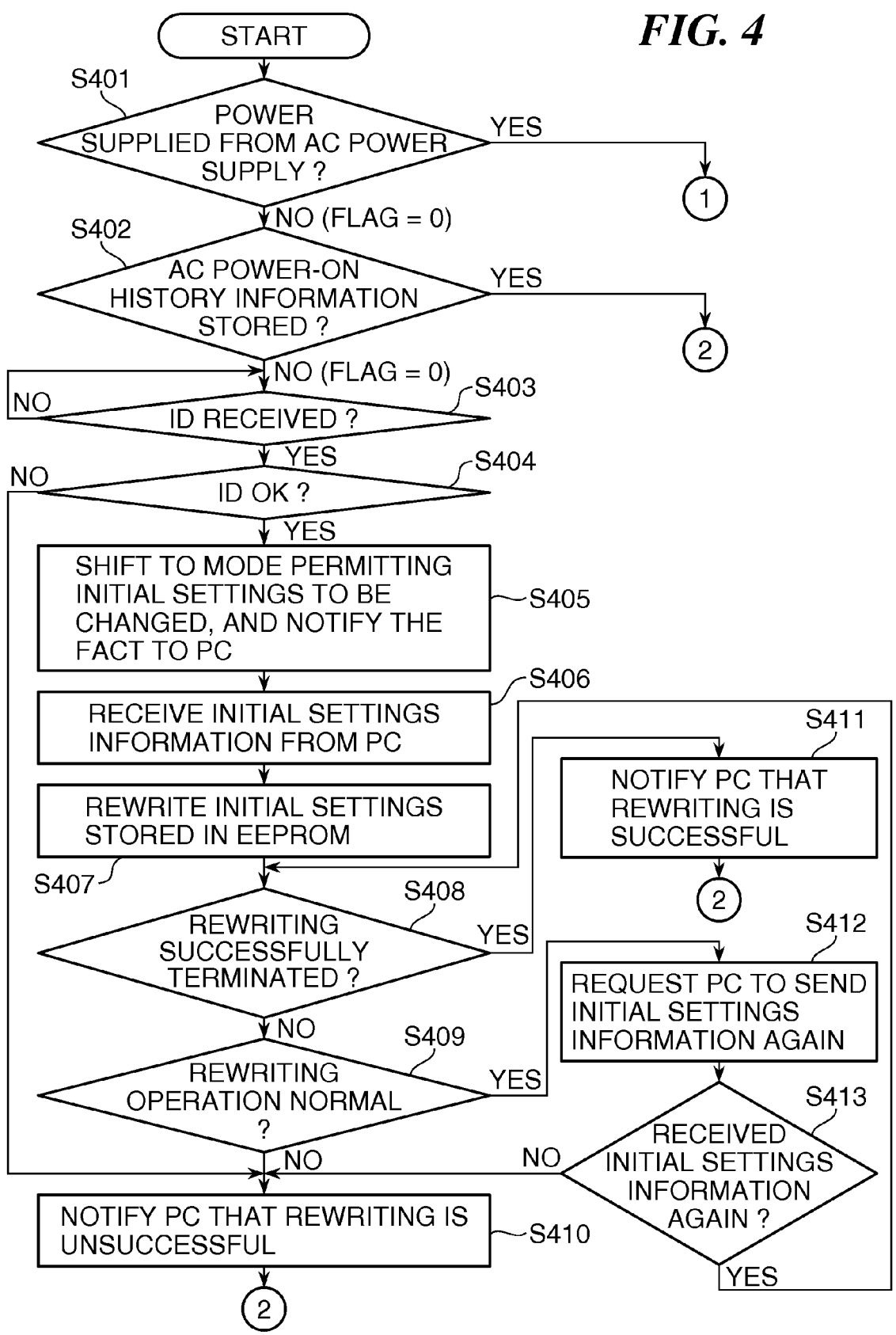
FIG. 4 is a flowchart of an initial settings-changing process executed by the multifunction peripheral implementing the processing apparatus according to the first embodiment.
Figure 5:
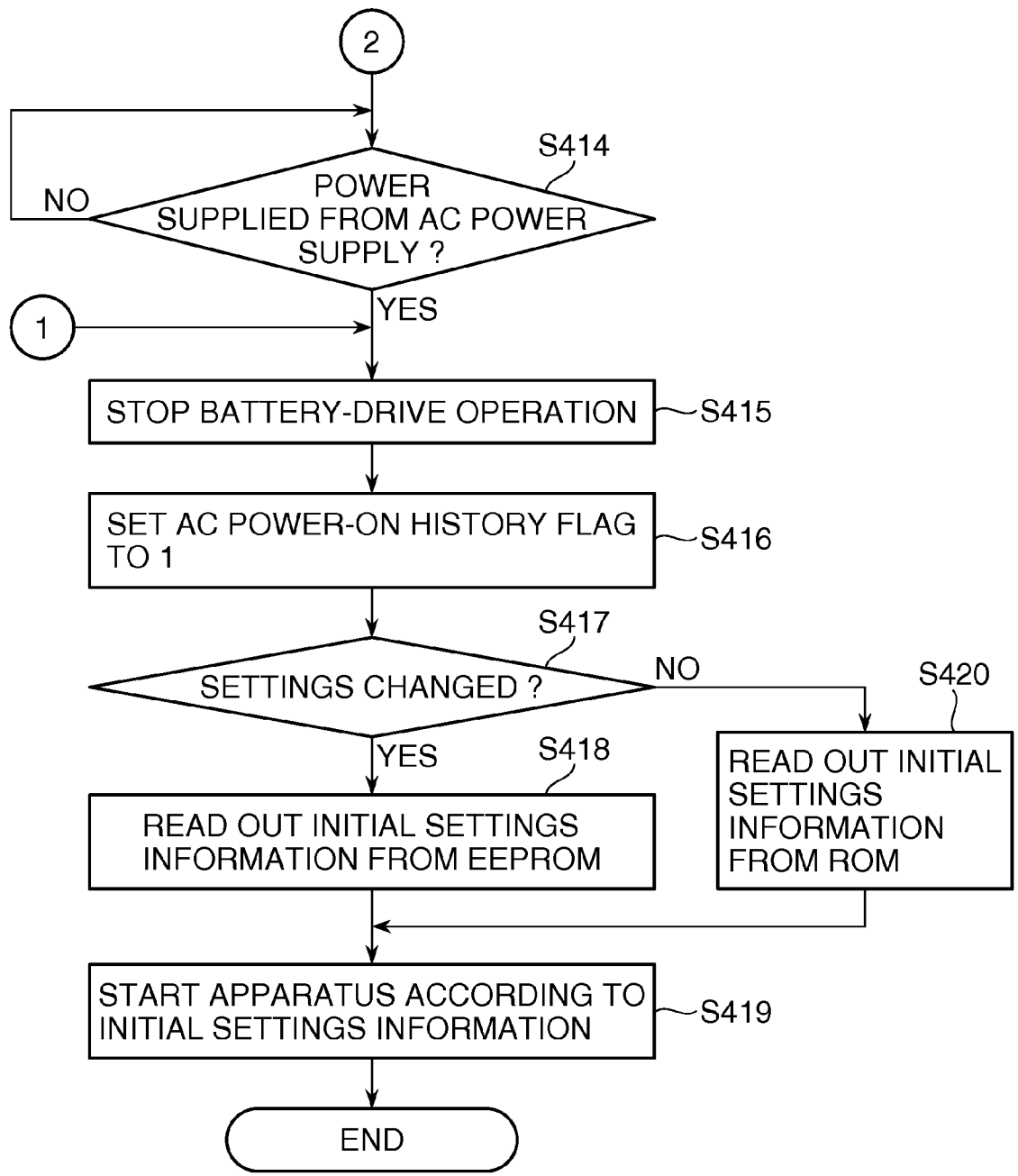
FIG. 5 is a continuation of the FIG. 4 flowchart.

FIGS. 4 and 5 are a flowchart of the initial settings-changing process executed by the MFP 1000 implementing the processing apparatus according to the first embodiment. It should be noted that in the present embodiment, a part of the initial settings-changing process shown in FIG. 4 is controlled by the MCU 110 of the wireless communication unit 100 incorporated in the controller 1100 of the MFP 1000, and a continuation of the process shown in FIG. 5 is controlled by the ASIC 30.

The MCU 110 determines, based on a first flag, whether electric power is supplied from an alternating current (AC) power supply (main power supply) or from a battery power supply (sub power supply), such as a dry cell (S401). The first flag is set to 1 when the AC power supply is used, and set to 0 when the battery power supply is used. When the MFP 1000 is in a state packaged in a shipping carton, the first flag is equal to 0.

If the first flag is equal to 0, i.e. if the battery power supply, such as a dry cell, is being used, the MCU 110 determines, based on a second flag, whether or not the AC power supply has ever been used (S402). The second flag is set to 1 when power-on history information on the AC power supply has been stored, and is set to 0 when the power-on history information has not been stored. When the MFP 1000 is in the state packaged in a shipping carton, the second flag is set to 0.

When the battery power supply, such as a dry cell, is in use, only the wireless communication unit 100 is operable, and the other modules of the controller 1100 of the MFP 1000 are not in operation. If the second flag is set to 0, i.e. if the power-on history information has not been stored, the MCU 110 reads out the identification information (ID) of the MFP 1000 stored in the EEPROM 130 of the wireless communication unit 100. As a consequence, the wireless communication unit 100 enters a wireless communication standby state (S403). That is, when the MFP 1000 is in a state packaged for shipping e.g. in a dealer's shop, only the wireless communication unit 100 is held in the wireless communication standby state by the battery power supply, such as a dry cell.

Now, it is assumed that in the dealer's shop, information, such as a serial number, for identifying each MFP is read out e.g. from a barcode and registered in advance in the dealer's PC 2000 or the like. Then, when a user purchases an MFP 1000 in the dealer's shop, the dealer specifies identification information (ID) assigned to the purchased MFP 1000, using the dealer's PC 2000, and wireless communication is established based on the identification information (ID).

Referring again to the FIG. 4 flowchart, upon receipt of identification information (ID) from the dealer's PC 2000 through wireless communication (S403), the MCU 110 determines whether or not the identification information (ID) matches the identification information (ID) stored in advance (S404).

If the identification information (ID) received through wireless communication matches the identification information (ID) stored in advance, it is determined that a secure wireless communication channel between the dealer's PC 2000 and the MFP 1000 has been established. Then, the MCU 110 notifies the dealer's PC 2000 of establishment of the secure wireless communication channel and shift to a mode permitting initial settings to be changed (S405).

The dealer having received this notification via the dealer's PC 2000 carries out the following operation: When the user desires to change the initial settings upon purchase of the MFP 1000, the dealer changes the initial settings using initial settings configuration software provided in the dealer's PC 2000.

Now, the operation for changing the initial settings will be described with reference to FIG. 6. FIG. 6 is a view of an initial settings-changing screen displayed on the display 2100 of the dealer's PC 2000.

Figure 6:
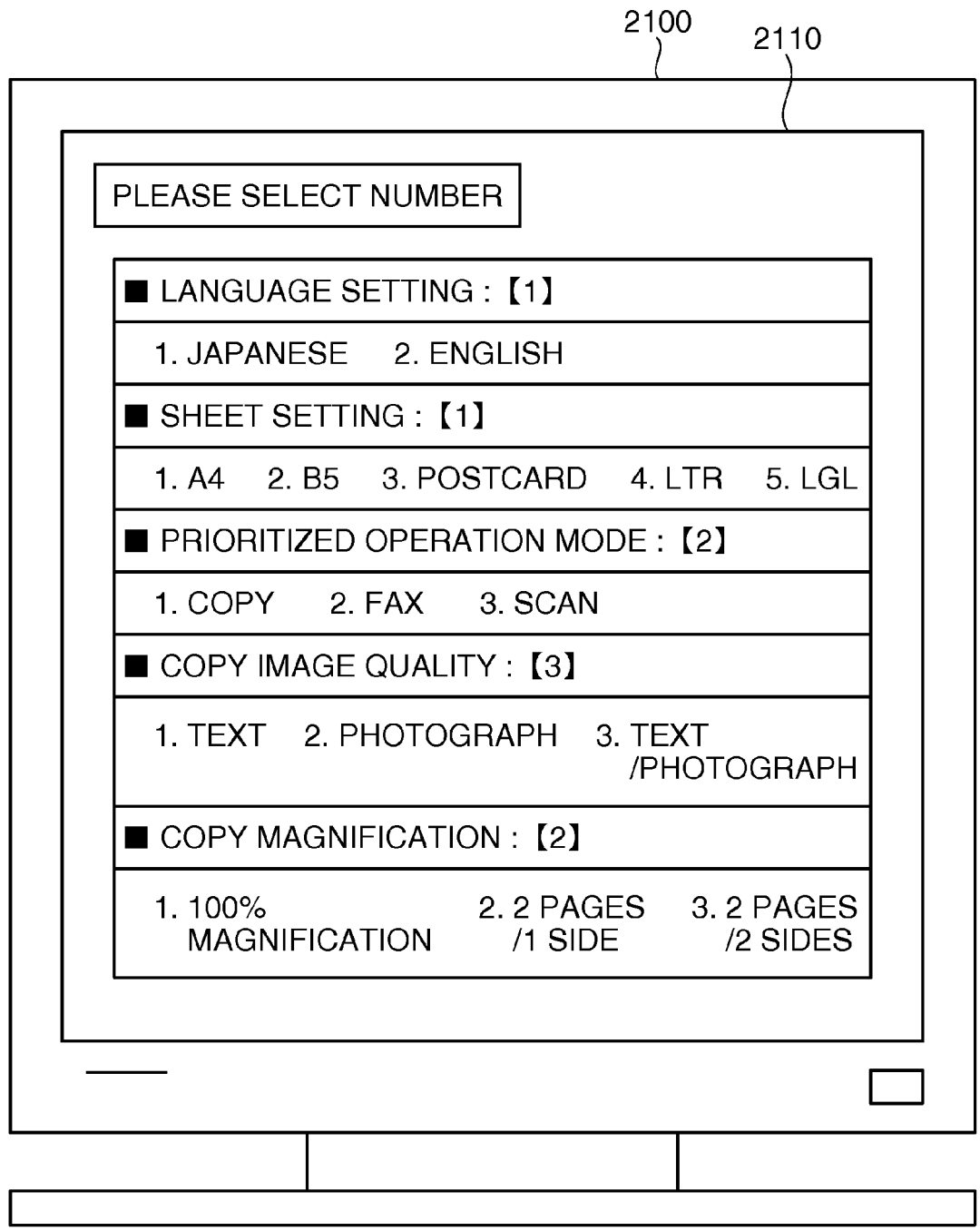
FIG. 6 is a view of an initial settings-changing screen displayed on a display of the dealer's PC.

Referring to FIG. 6, on the display 2100 of the dealer's PC 2000, there is displayed the initial settings-changing screen 2110 provided by the initial settings configuration software. In the illustrated example, initial settings are changed as described below. The dealer changes the settings according to user desire while viewing the initial settings-changing screen 2110 provided by the initial settings configuration software.

For a language setting, "1; Japanese" is selected (the same as a default setting)

For a sheet setting, "1: A4" is selected (the same as a default setting)

For a prioritized operation mode, "2: FAX" is selected (changed from a default setting "COPY")

For copied image quality, "3: text/photograph" is selected (changed from a default setting "text")

For a copy magnification, "2: 2 pages/one side) (changed from a default setting "100% magnification")

These initial settings are sent as first initial settings information through wireless communication from the wireless communication unit 200 of the dealer's PC 2000 to the MFP 1000 as a purchased article.

Referring again to the FIG. 4 flowchart, the MCU 110 of the wireless communication unit 100 of the MFP 1000 receives the first initial settings information sent from the dealer's PC 2000 through wireless communication (S406). The MCU 110 rewrites the initial settings information (second initial settings information) stored in advance in the EEPROM 130 of the wireless communication unit 100 with the received first initial settings information (S407).

Then, the MCU 110 checks whether or not the initial settings information has been normally rewritten (S408). More specifically, the MCU 110 reads out the second initial settings information stored in the EEPROM 130 of the wireless communication unit 100, and compares the second initial settings information with the first initial settings information received from the dealer's PC 2000. If the first initial settings information and the second initial settings information do not match each other, the MCU 110 checks whether or not a trouble has occurred in the operation for writing into the EEPROM 130 (S409). More specifically, the MCU 110 writes and reads data in and from an area other than a portion of the EEPROM 130 where the second initial settings information is stored. When the written data and the read-out data match each other, it is determined that the operation of writing into the EEPROM 130 is normal, but the rewriting of the initial settings information is unsuccessful. Therefore, the MCU 110 requests the dealer's PC 2000 to send the initial settings information again, and then enters a reception waiting state (S412).

On the other hand, if the first initial settings information and the second initial settings information match each other (YES to S408), the MCU 110 notifies the dealer's PC 2000 that the rewriting of the initial settings information is successfully terminated (S411). Further, if it is determined in the step S409 that the written data and the read-out data do not match each other, it is determined that the operation of writing into the EEPROM 130 is not normal, and hence, in this case, the MCU 110 notifies the dealer's PC 2000 that the rewriting of the initial settings information is unsuccessfully terminated (S410)

When the MCU 110 receives the initial settings information again from the dealer's PC 2000 (S413), the process returns to the step S408, wherein the MCU 110 checks whether or not the rewriting of the initial settings information is successfully terminated. In this case, there is a fear that there occurs an endless loop from the step S408 wherein the rewriting of initial settings is determined to be unsuccessful, through the step S09 wherein the rewriting operation is determined to be normal, back to the step S408. Therefore, a means is provided for counting the execution of the above-mentioned loop so as to limit the count to a predetermined value. When the count of the repeated execution of the loop reaches the predetermined value, the MCU 110 notifies the dealer's PC 2000 that the rewriting of the initial settings information is unsuccessfully terminated (S410).

Next, control by the ASIC 30 incorporated in the controller 1100 of the MFP 1000 will be described with reference to FIG. 5.

When AC power is supplied from the AC power supply 1200 (S414), the ASIC 30 controlling the overall operation of the controller 1100 stops the battery-driven operation of the wireless communication unit 100 using the battery 20 (S415). Then, the ASIC 30 sets the second flag indicative of presence/absence of the power-on history information to 1 (S416).

Next, the ASIC 30 communicates with the MCU 110 to determine whether or not the initial settings information has been changed (S417). More specifically, the ASIC 30 performs comparison between the initial settings information stored in the EEPROM 130 and the initial settings information stored in the ROM 40. If they match each other, it is determined that the initial settings information has not been changed, whereas if not, it is determined that the initial settings information has been changed.

If the initial settings information has been changed, the MCU 110 reads out the first initial settings information stored in the EEPROM 130, and sends the information to the ASIC 30 (S418). Then, the ASIC 30 is started according to the first initial settings information (changed information) stored in the EEPROM 130 (S419).

On the other hand, if the initial settings information has not been changed (NO to S417), the ASIC 30 reads out the second initial settings information (unchanged information) from the ROM 40 incorporated in the controller 1100 (S420). Then, the ASIC 30 is started according to the second initial settings information (unchanged information) (S419).

The above-described first embodiment provides the following advantageous effects:

(1) Since initial settings can be changed as a user desires upon purchase of an MFP 1000, it is possible to save the user troublesome work for changing the initial settings, to thereby enable the user to start using the MFP 1000 configured as desired immediately after the purchase of the same.

(2) Since wireless communication is used, it is possible to change the initial settings upon purchase of the MFP 1000 without unpacking the MFP from a shipping carton.

(3) Since a secure wireless communication channel is established using an ID, it is possible to prevent initial settings information from being rewritten carelessly through another wireless communication.

(4) Since power-on history information is stored, it is possible to prevent the initial settings information from being changed when the power of the MFP 1000 is turned on again after the purchase of the MFP 1000.

Next, a second embodiment of the present invention will be described with reference to FIG. 7. The second embodiment is distinguished from the first embodiment in that it is possible to check whether or not contents of settings for rewriting of initial settings information are consistent. The second embodiment is identical to the first embodiment in the other respects. Therefore, elements corresponding to those in the first embodiment are denoted by identical reference numerals, and description thereof is omitted.

Figure 7:
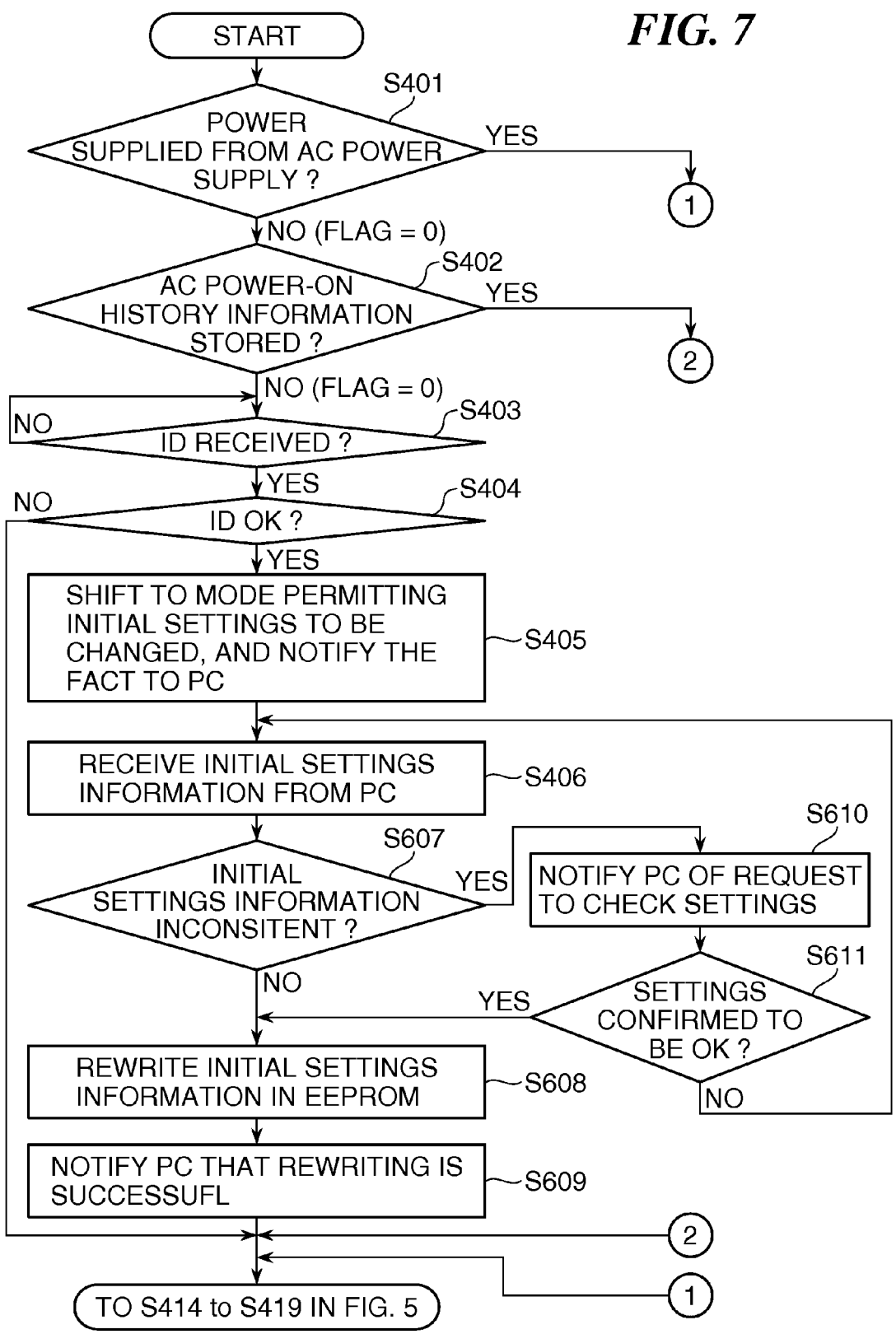
FIG. 7 is a flowchart of an initial settings-changing process executed by a multifunction peripheral implementing a processing apparatus according to a second embodiment of the present invention.

FIG. 7 is a flowchart of an initial settings-changing process executed by the MFP 1000 implementing a processing apparatus according to the second embodiment. Steps identical to those in FIG. 4 are denoted by identical step numbers, and description thereof is omitted.

Steps S401 to S406 in FIG. 7 are identical to those described hereinbefore with reference to FIG. 4. The MCU 110 of the wireless communication unit 100 of the MFP 1000 receives the first initial settings information from the dealer's PC 2000 in the step S406, and the process proceeds to a step S607.

In the step S607, the MCU 110 checks whether or not the received first initial settings information contains any inconsistency. For example, assuming that the use of the English language is specified in the first initial settings information, if 220V power supply is specified for the apparatus, it is determined that the first initial settings contain an inconsistency because 110V power supply is a setting compatible with the English speaking regions. It should be noted that information concerning the apparatus specifications is stored in advance in the EEPROM 130.

If the received first initial settings information does not contain any inconsistency (NO to S607), the MCU 110 rewrites the second initial settings information stored in advance in the EEPROM 130, with the first initial settings information (S608). Then, the MCU 110 notifies the dealer's PC 2000 that the rewriting of the initial settings information is successfully terminated (S609).

On the other hand, if the received first initial settings information contains an inconsistency (YES to S607), the MCU 110 reserves execution of rewriting in the step S608, and notifies the dealer's PC 2000 that the inconsistency is contained in the first initial settings information (S610).

Then, the user and the dealer check the setting on the dealer's PC 2000 to determine whether or not the setting determined to be inconsistent has been configured intentionally. For example, in the case where the use of the English language is specified in the first initial settings information and 220V power supply is specified for the apparatus, if the user's mother tongue is English, it is determined that the setting has been configured intentionally. Therefore, it is determined that the first initial settings information contains no erroneous setting, and the dealer sends notification information indicating that it has been checked that the settings are correct to the MCU 110 of the MFP 1000, using the dealer's PC 2000.

Upon receipt of the notification information that the contents of the settings are normal, in a step S611, the MCU 110 of the MFP 1000 executes processing in the steps S608 et seq. Then, after execution of the step S609, the MCU 110 carries out the same processing as the steps S414 to S419 in FIG. 5 under the control of the ASIC 30.

Although in the above description, when the first initial settings information received from the dealer's PC 2000 contains an inconsistency (YES to S607), the MCU 110 notifies the dealer's PC 2000 of the fact (S610), the present process may be immediately terminated without rewriting the initial settings or sending the notification to the dealer's PC 2000, but the ASIC 30 may be configured to be started according to the initial settings information stored in the ROM 40, when the MFP 1000 is operated by the AC power supply.

As described above, according to the second embodiment, the MCU 110 of the MFP 1000 determines whether or not the initial settings information contains any inconsistency, and the user can check an inconsistency if any, which improves the user friendliness of the apparatus.

It is to be understood that the present invention may also be accomplished by supplying a system or an apparatus with a storage medium in which a program code of software, which realizes the functions of either of the above described embodiments, is stored, and causing a computer (or CPU or MPU) of the system or apparatus to read out and execute the program code stored in the storage medium.

In this case, the program code itself read from the storage medium realizes the functions of either of the above described embodiments, and therefore the program code and the storage medium in which the program code is stored constitute the present invention.

Examples of the storage medium for supplying the program code include a floppy (registered trademark) disk, a hard disk, a magnetic-optical disk, an optical disk, such as a CD-ROM, a CD-R, a CD-RW, a DVD-ROM, a DVD-RAM, a DVD-RW, or a DVD+RW, a magnetic tape, a nonvolatile memory card, and a ROM. Alternatively, the program may be downloaded via a network.

Further, it is to be understood that the functions of either of the above described embodiments may be accomplished not only by executing the program code read out by a computer, but also by causing an OS (operating system) or the like which operates on the computer to perform a part or all of the actual operations based on instructions of the program code.

Further, it is to be understood that the functions of either of the above described embodiments may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

The image forming apparatus in the present invention is not limited to an MFP, but it may be implemented by a printer, a copying machine, a scanner, a facsimile machine, or the like apparatus. Further, the external apparatus in the present invention is not limited to a personal computer, but it may be implemented by a server terminal, a cellular phone, a PDA, or the like portable terminal apparatus.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2008-129493 filed May 16, 2008, which is hereby incorporated by reference herein in its entirety.

What is claimed is:

1. A processing apparatus comprising:
a wireless communication unit configured to be operable by a main power supply or a sub power supply;
a first storage unit configured to be operable by the main power supply or the sub power supply and store information on settings for operation of the apparatus;

a second storage unit configured to be operable by the main power supply and store information on settings for operation of the apparatus;

a first determination unit configured to be operable by the main power supply or the sub power supply and determine whether electric power is currently supplied from the main power supply or from the sub power supply;

a second determination unit configured to be operable by the main power supply or the sub power supply and determine whether or not power-on history information on the main power supply has been stored;

a rewriting unit configured to be operable, when said first determination unit determines that electric power is currently supplied from the sub power supply and when said second determination unit determines that no power-on history information on the main power supply has been stored, to rewrite the information on the settings stored in said first storage unit, based on information on settings received from an external apparatus by said wireless communication unit; and a comparison unit configured to be operable, when the processing apparatus is operated by the main power supply, to perform comparison between the information on the settings stored in said first storage unit and the information on the settings stored in said second storage unit, wherein when said comparison unit determines that a result of the comparison does not indicate a match, the processing apparatus is started based on the information on the settings stored in said first storage unit, whereas when the result of the comparison indicates a match, the processing apparatus is started based on the information on the settings stored in said second storage unit.

2. A processing apparatus comprising:

a wireless communication unit configured to be operable by a main power supply or a sub power supply;

a storage unit configured to be operable by the main power supply or the sub power supply and store information on settings for operation of the apparatus;

a first determination unit configured to be operable by the main power supply or the sub power supply and determine whether electric power is currently supplied from the main power supply or from the sub power supply;

a second determination unit configured to be operable by the main power supply or the sub power supply and determine whether or not power-on history information on the main power supply has been stored;

a third determination unit configured to determine, by referring to stored information in said storage unit, whether or not information on the settings received from the external apparatus by said wireless communication unit contains any inconsistency; and a rewriting unit configured to be operable, when said first determination unit determines that electric power is currently supplied from the sub power supply and when said second determination unit determines that no power-on history information on the main power supply has been stored, to rewrite the information on the settings stored in said storage unit, based on information on settings received from an external apparatus by said wireless communication unit, wherein when said third determination unit determines that the information on the settings received from the external apparatus by said wireless communication unit contains any inconsistency, execution of rewriting by said rewriting unit is reserved, and notification information is sent to the external apparatus.

3. A processing apparatus comprising:

a wireless communication unit configured to be operable by a main power supply or a sub power supply;

a first storage unit configured to be operable by the main power supply or the sub power supply and store information on settings for operation of the apparatus;

a second storage unit configured to be operable by the main power supply and store information on settings for operation of the apparatus;

a first determination unit configured to be operable by the main power supply or the sub power supply and determine whether electric power is currently supplied from the main power supply or from the sub power supply;

a second determination unit configured to be operable by the main power supply or the sub power supply and determine whether or not power-on history information on the main power supply has been stored;

a third determination unit configured to determine, by referring to stored information in said first storage unit, whether or not information on the settings received from the external apparatus by said wireless communication unit contains any inconsistency; and a rewriting unit configured to be operable, when said first determination unit determines that electric power is currently supplied from the sub power supply and when said second determination unit determines that no power-on history information on the main power supply has been stored, to rewrite the information on the settings stored in said first storage unit, based on information on settings received from an external apparatus by said wireless communication unit, wherein when said third determination unit determines that the information on the settings received from the external apparatus by said wireless communication unit contains any inconsistency, the processing apparatus is started based on the information on the settings stored in said second storage unit, when the processing apparatus is operated by the main power supply.

4. A method of controlling a processing apparatus including a wireless communication unit configured to be operable by a main power supply or a sub power supply, a first storage unit configured to be operable by the main power supply or the sub power supply and store information on settings for operation of the apparatus, and a second storage unit configured to be operable by the main power supply and store information on settings for operation of the apparatus, the method comprising the steps of:

determining whether electric power is currently supplied from the main power supply or from the sub power supply;

determining whether or not power-on history information on the main power supply has been stored;

rewriting the information on the settings stored in the first storage unit, based on information on settings received from an external apparatus by the wireless communication unit, when the electric power is determined to be currently supplied from the sub power supply and when the power-on history information on the main power supply is determined to be not stored;

comparing between the information on the settings stored in the first storage unit and the information on the settings stored in the second storage unit when the processing apparatus is operated by the main power supply; and starting the processing apparatus based on the information on the settings stored in the first storage unit when a result of the comparing step does not indicate a match, whereas starting the processing apparatus based on the information on the settings stored in the second storage unit when the result of the comparing step indicates a match.

5. A non-transitory computer-readable storage medium storing a program executable by a computer to execute a method of controlling a processing apparatus including a wireless communication unit configured to be operable by a main power supply or a sub power supply, a first storage unit configured to be operable by the main power supply or the sub power supply and store information on settings for operation of the apparatus, and a second storage unit configured to be operable by the main power supply and store information on settings for operation of the apparatus, the method comprising the steps of:

determining whether electric power is currently supplied from the main power supply or from the sub power supply;

determining whether or not power-on history information on the main power supply has been stored;

rewriting the information on the settings stored in the first storage unit, based on information on settings received from an external apparatus by the wireless communication unit, when the electric power is determined to be currently supplied from the sub power supply and when the power-on history information on the main power supply is determined to be not stored;

comparing between the information on the settings stored in the first storage unit and the information on the settings stored in the second storage unit when the processing apparatus is operated by the main power supply; and starting the processing apparatus based on the information on the settings stored in the first storage unit when a result of the comparing step does not indicate a match, whereas starting the processing apparatus based on the information on the settings stored in the second storage unit when the result of the comparing step indicates a match.

6. A method of controlling a processing apparatus including a wireless communication unit configured to be operable by a main power supply or a sub power supply, and a storage unit configured to be operable by the main power supply or the sub power supply and store information on settings for operation of the apparatus, the method comprising the steps of:

determining whether electric power is currently supplied from the main power supply or from the sub power supply;

determining whether or not power-on history information on the main power supply has been stored;

determining, by referring to stored information in the storage unit, whether or not information on the settings received from the external apparatus by the wireless communication unit contains any inconsistency, rewriting the information on the settings stored in the storage unit, based on information on settings received from an external apparatus by the wireless communication unit, when the electric power is determined to be currently supplied from the sub power supply and when the power-on history information on the main power supply is determined to be not stored; and reserving the execution of rewriting in the rewriting step and sending notification information to the external apparatus, when the information on the settings received from the external apparatus by the wireless communication unit is determined to contain any inconsistency.

7. A non-transitory computer-readable storage medium storing a program executable by a computer to execute a method of controlling a processing apparatus including a wireless communication unit configured to be operable by a main power supply or a sub power supply, and a storage unit configured to be operable by the main power supply or the sub power supply and store information on settings for operation of the apparatus, the method comprising the steps of:

determining whether electric power is currently supplied from the main power supply or from the sub power supply;

determining whether or not power-on history information on the main power supply has been stored;

determining, by referring to stored information in the storage unit, whether or not information on the settings received from the external apparatus by the wireless communication unit contains any inconsistency;

rewriting the information on the settings stored in the storage unit, based on information on settings received from an external apparatus by the wireless communication unit, when the electric power is determined to be currently supplied from the sub power supply and when the power-on history information on the main power supply is determined to be not stored; and reserving the execution of rewriting in the rewriting step and sending notification information to the external apparatus, when the information on the settings received from the external apparatus by the wireless communication unit is determined to contain any inconsistency.

8. A method of controlling a processing apparatus including a wireless communication unit configured to be operable by a main power supply or a sub power supply, a first storage unit configured to be operable by the main power supply or the sub power supply and store information on settings for operation of the apparatus, and a second storage unit configured to be operable by the main power supply and store information on settings for operation of the apparatus, the method comprising the steps of:

determining whether electric power is currently supplied from the main power supply or from the sub power supply;

determining whether or not power-on history information on the main power supply has been stored;

determining, by referring to stored information in the first storage unit, whether or not information on the settings received from the external apparatus by the wireless communication unit contains any inconsistency;

rewriting the information on the settings stored in the first storage unit, based on information on settings received from an external apparatus by the wireless communication unit, when the electric power is determined to be currently supplied from the sub power supply and when the power-on history information on the main power supply is determined to be not stored; and starting the processing apparatus based on the information on the settings stored in the second storage unit, when the processing apparatus is operated by the main power supply and when the information on the settings received from the external apparatus by the wireless communication unit is determined to contain any inconsistency.

9. A non-transitory computer-readable storage medium storing a program executable by a computer to execute a method of controlling a processing apparatus including a wireless communication unit configured to be operable by a main power supply or a sub power supply, a first storage unit configured to be operable by the main power supply or the sub power supply and store information on settings for operation of the apparatus, and a second storage unit configured to be operable by the main power supply and store information on settings for operation of the apparatus, the method comprising the steps of:

- determining whether electric power is currently supplied from the main power supply or from the sub power supply;
- determining whether or not power-on history information on the main power supply has been stored;
- determining, by referring to stored information in the first storage unit, whether or not information on the settings received from the external apparatus by the wireless communication unit contains any inconsistency;
- rewriting the information on the settings stored in the first storage unit, based on information on settings received from an external apparatus by the wireless communication unit, when the electric power is determined to be currently supplied from the sub power supply and when the power-on history information on the main power supply is determined to be not stored; and
- starting the processing apparatus based on the information on the settings stored in the second storage unit, when the processing apparatus is operated by the main power supply and when the information on the settings received from the external apparatus by the wireless communication unit is determined to contain any inconsistency.

* * * * *